(12) United States Patent
Wang et al.

(10) Patent No.: US 9,350,688 B2
(45) Date of Patent: May 24, 2016

(54) FATIGUE CONTROL-BASED MESSAGE FLOAT-OUT METHOD, SYSTEM AND INSTANT MESSAGING CLIENT

(71) Applicant: Alibaba Group Holding Limited, George Town, KY (US)

(72) Inventors: Mei Wang, Hangzhou (CN); Guan Wang, Hangzhou (CN)

(73) Assignee: Alibaba Group Holding Limited (KY)

( * ) Notice: Subject to any disclaimer, the term of this patent is extended or adjusted under 35 U.S.C. 154(b) by 557 days.

(21) Appl. No.: 13/718,826

(22) Filed: Dec. 18, 2012

(65) Prior Publication Data

US 2013/0173708 A1 Jul. 4, 2013

(30) Foreign Application Priority Data

Dec. 30, 2011 (CN) .......................... 2011 1 0454350

(51) Int. Cl.
*G06F 15/16* (2006.01)
*H04L 12/58* (2006.01)

(52) U.S. Cl.
CPC ............... *H04L 51/04* (2013.01); *H04L 12/581* (2013.01); *H04L 51/12* (2013.01); *H04L 51/26* (2013.01)

(58) Field of Classification Search
CPC ....... H04L 51/04; H04L 12/581; H04L 51/12; H04L 51/26
USPC ........................................................ 709/204
See application file for complete search history.

(56) References Cited

U.S. PATENT DOCUMENTS

| | | | |
|---|---|---|---|
| 5,943,478 A * | 8/1999 | Aggarwal et al. .................. | 726/3 |
| 6,047,310 A | 4/2000 | Kamakura et al. | |
| 6,101,393 A * | 8/2000 | Alperovich et al. .......... | 455/466 |
| 6,415,318 B1 | 7/2002 | Aggarwal et al. | |
| 7,962,955 B2 * | 6/2011 | Boss et al. ....................... | 726/22 |
| 2001/0008404 A1 | 7/2001 | Naito et al. | |
| 2002/0159387 A1 * | 10/2002 | Allison et al. ................ | 370/229 |
| 2004/0128359 A1 * | 7/2004 | Horvitz et al. ................ | 709/207 |

(Continued)

FOREIGN PATENT DOCUMENTS

| | | |
|---|---|---|
| CN | 101068222 | 11/2007 |
| JP | 2001067036 | 3/2001 |

(Continued)

*Primary Examiner* — Kristie Shingles
*Assistant Examiner* — Timothy Sowa
(74) *Attorney, Agent, or Firm* — Van Pelt, Yi & James LLP (57) ABSTRACT

Embodiments of the present application relate to a method of controlling float-out messages, a system for controlling float-out messages, an instant messaging client for controlling float-out messages, and a computer program product for controlling float-out messages. A method of controlling float-out messages is provided. The method includes in the event that there is a float-out message that is ready to be sent to a recipient, determining a current status of the recipient of the float-out message, in the event that the current status of the recipient is online, determining whether the float-out message should be sent to the recipient, including determining whether an identifier value of the recipient has reached a threshold value, the identifier value being used to indicate whether the recipient is deemed to be currently in a state of fatigue or a level of fatigue the recipient is deemed to be in, in the event that the identifier value has not reached the threshold value, pushing the float-out message to the recipient to be made available for float out by the recipient, and updating the identifier value.

17 Claims, 5 Drawing Sheets

(56) References Cited

U.S. PATENT DOCUMENTS

| | | | |
|---|---|---|---|
| 2004/0154022 A1* | 8/2004 | Boss et al. | 719/310 |
| 2004/0249900 A1* | 12/2004 | Karstens | 709/207 |
| 2004/0254998 A1* | 12/2004 | Horvitz | 709/206 |
| 2005/0149622 A1* | 7/2005 | Kirkland et al. | 709/207 |
| 2006/0075029 A1* | 4/2006 | Kelso et al. | 709/206 |
| 2006/0277262 A1* | 12/2006 | Boss et al. | 709/206 |
| 2007/0022172 A1* | 1/2007 | Anglin et al. | 709/207 |
| 2007/0064899 A1* | 3/2007 | Boss et al. | 379/201.01 |
| 2007/0143472 A1* | 6/2007 | Clark et al. | 709/224 |
| 2008/0147795 A1* | 6/2008 | Heidloff et al. | 709/204 |
| 2010/0299393 A1* | 11/2010 | O'Sullivan et al. | 709/206 |
| 2011/0314106 A1* | 12/2011 | Bansal et al. | 709/206 |

FOREIGN PATENT DOCUMENTS

| | | |
|---|---|---|
| JP | 2001312508 | 11/2001 |
| JP | 2003304333 | 10/2003 |
| JP | 2005037757 | 2/2005 |
| JP | 2005182214 | 7/2005 |
| JP | 2007318429 | 12/2007 |
| JP | 2008171315 | 7/2008 |
| JP | 2010218064 | 9/2010 |
| JP | 2011191862 | 9/2011 |

* cited by examiner

FATIGUE CONTROL-BASED MESSAGE FLOAT-OUT METHOD, SYSTEM AND INSTANT MESSAGING CLIENT

CROSS REFERENCE TO OTHER APPLICATIONS

This application claims priority to People's Republic of China Patent Application No. 201110454350.1 entitled A FATIGUE CONTROL-BASED MESSAGE FLOAT-OUT METHOD, SERVER AND INSTANT MESSAGING CLIENT filed Dec. 30, 2011 which is incorporated herein by reference for all purposes.

FIELD OF THE INVENTION

This application involves a fatigue control-based message float-out method, system, and instant messaging client.

BACKGROUND OF THE INVENTION

Generally, float-out of messages on instant messaging systems involves proactively pushing the messages to a user in one part of a main instant messaging window. Because the display format of the messages is passively received by the user, message float-out is an effective means of promotion, is widely used for posting news, notices, and advertising information, and is able to convey information to users quickly and accurately.

For messages floated out in existing instant messaging systems, an instant messaging server pushes a plurality of float-out messages, and initializes validity periods of the float-out messages at the time that the float-out messages are pushed. The instant messaging server discards the float-out messages once the validity period has been exceeded; otherwise, the user receives the float-out messages upon logging in.

Therefore, the float-out of messages on existing instant messaging systems typically lack effective technical controls. Users usually are only able to passively receive the float-out messages. In other words, the float-out of messages on existing instant messaging systems may result in the harassment of the user and adversely affect the user experience. Users are unable to selectively receive float-out messages. For example, some important float-out messages are often hidden among a large amount of less important messages affecting the user's ability to receive important messages. Furthermore, when users that are logged in but have left their computer, a plurality of float-out messages may be generated while the user was away, and the plurality of float-out messages typically are pushed out all at once, resulting in a poor user experience.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A technique for controlling float-out messages based on an estimation of user fatigue is disclosed. As used herein, user fatigue refers to a reduction in effectiveness of a float-out message as the user receives more float-out messages. A user is deemed to be fatigued when, for example, a number of float-out messages received exceeds a predefined threshold within the unit of time. A fatigue period can correspond with the unit of time. The following disclosure discloses setting a fatigue period and a limit on the number of float-out messages within the fatigue period in advance, and setting an identifier value used to indicate the fatigue level. For example, the identifier value can be used to indicate whether a recipient is deemed to be currently in a state of fatigue or the level of fatigue the recipient is deemed to be. The identifier value is updated based on the limit on the number of float-out messages within a unit of time, and the limit on the number of float-out messages within the unit of time is determined based on the number of float-out messages received, the fatigue period and the limit on the number of messages. Therefore, during each float-out task, in order to implement fatigue control of message float-out for users, a determination is made whether the user is deemed to be currently in a state of fatigue based on the identifier value.

In order to disclose the fatigue control-based message float-out method, the configuration of the fatigue control-based message float-out system will be disclosed. This configuration is only intended to aid in describing the present application, and does not limit the scope of the present application.

Figure 1:
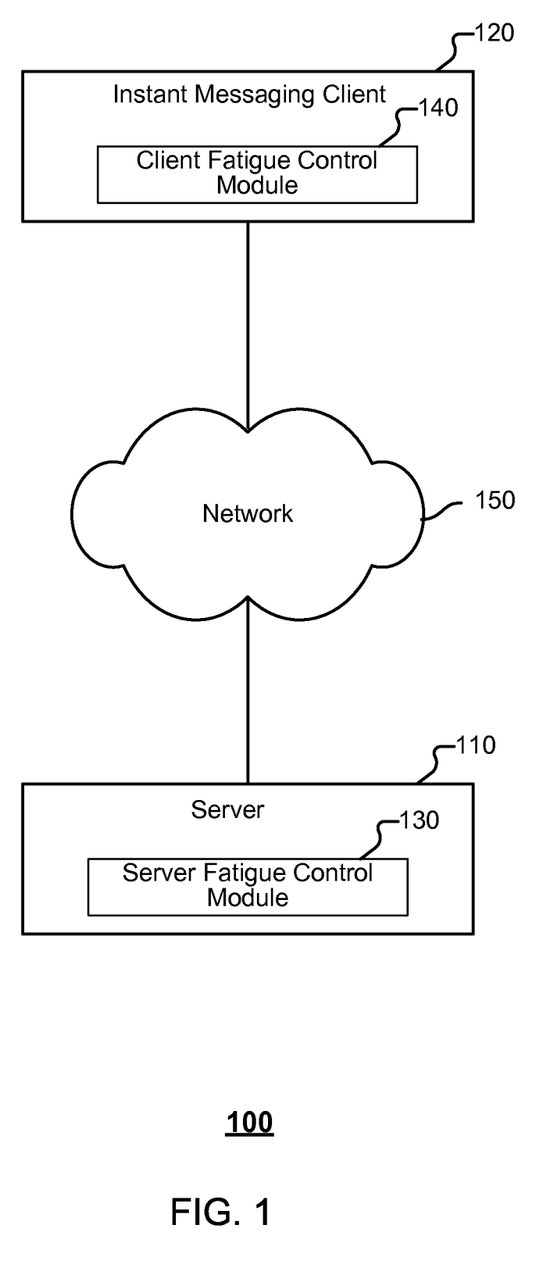
FIG. 1 is a schematic diagram of a fatigue control-based message float-out system.

FIG. 1 is a schematic diagram of an embodiment of a messaging system that controls message float-out based on an estimation of user fatigue. The system 100 comprises an instant messaging client 120 connected to a server 110 via a network 150. The server 110 includes a server fatigue control module 130, and the instant messaging client 120 includes a client fatigue control module 140.

In some embodiments, administrative personnel can use an administration interface on the server 110 to set fatigue periods for individual users, limits on the number of float-out messages within the fatigue period, float-out message priority levels, specific content of the float-out messages, and/or other appropriate configuration parameters. In some embodiments, the administrative personnel can remotely set the fatigue periods for individual users, limits on the number of float-out messages within the fatigue period, float-out message priority levels, specific content of the float-out messages, and/or other appropriate configuration parameters from a machine other than the server 110. In some embodiments, the administrative personnel can also use user clicks and browsing information relating to float-out messages to determine the fatigue period, the limits on the number of float-out messages within the fatigue period, the float-out message priority levels, and the specific content of the float-out messages. For example, the administrative personnel can review recorded access logs when float-out messages are accessed to determine the typical length of time during which users exhibit interest in float-out messages and what kinds of float-out messages interest the user. Thus, the administrative personnel can set a relevant fatigue period, the limit on the number of float-out messages within the fatigue period, and priority levels for float-out messages. The relevant fatigue period, the limit on the number of float-out messages within the fatigue period, and priority levels for float-out messages can be stored in a message database.

Upon initialization, the server fatigue control module 130 on the server 110 sets an identifier value to indicate whether the user is deemed by control module 130 to be currently in a state of fatigue. A user's identifier value can be stored in a field in a database, and the identifier value is updated based on the set fatigue period, the limit on the number of float-out messages, and the number of float-out messages already received. For example, the identifier value is updated based on the limit on the number of float-out messages within a unit of time. The server 110 selects the recipients to whom a float-out message is to be pushed based on the attributes of the desired recipients to whom the float-out message is to be pushed, and based on the identifier values updated by the server fatigue control module 130, the server 110 pushes the float-out messages to the recipients.

It is understood that the fatigue control taking place on the server 110 can also take place at the instant messaging client 120. In other words, the user of the instant messaging client 110 can set a fatigue period (e.g., a length of time) and a limit on the number of float-out messages within the fatigue period on the instant messaging client 110. Upon initialization, the fatigue control module 140 of the instant messaging client 120 can set an identifier value to indicate the fatigue level value. For example, the identifier value indicates whether the user is currently in a state of fatigue. Subsequently, the identifier value is updated based on the set fatigue period, the limit on the number of float-out messages, and the number of float-out messages already received. For example, the identifier value is updated based on the limit on the number of float-out messages within a unit of time. Each time a float-out message is to be pushed, the fatigue control module 140 determines whether the limit on the number of float-out messages has been reached based on the identifier value before the float-out message is pushed.

Figure 2:
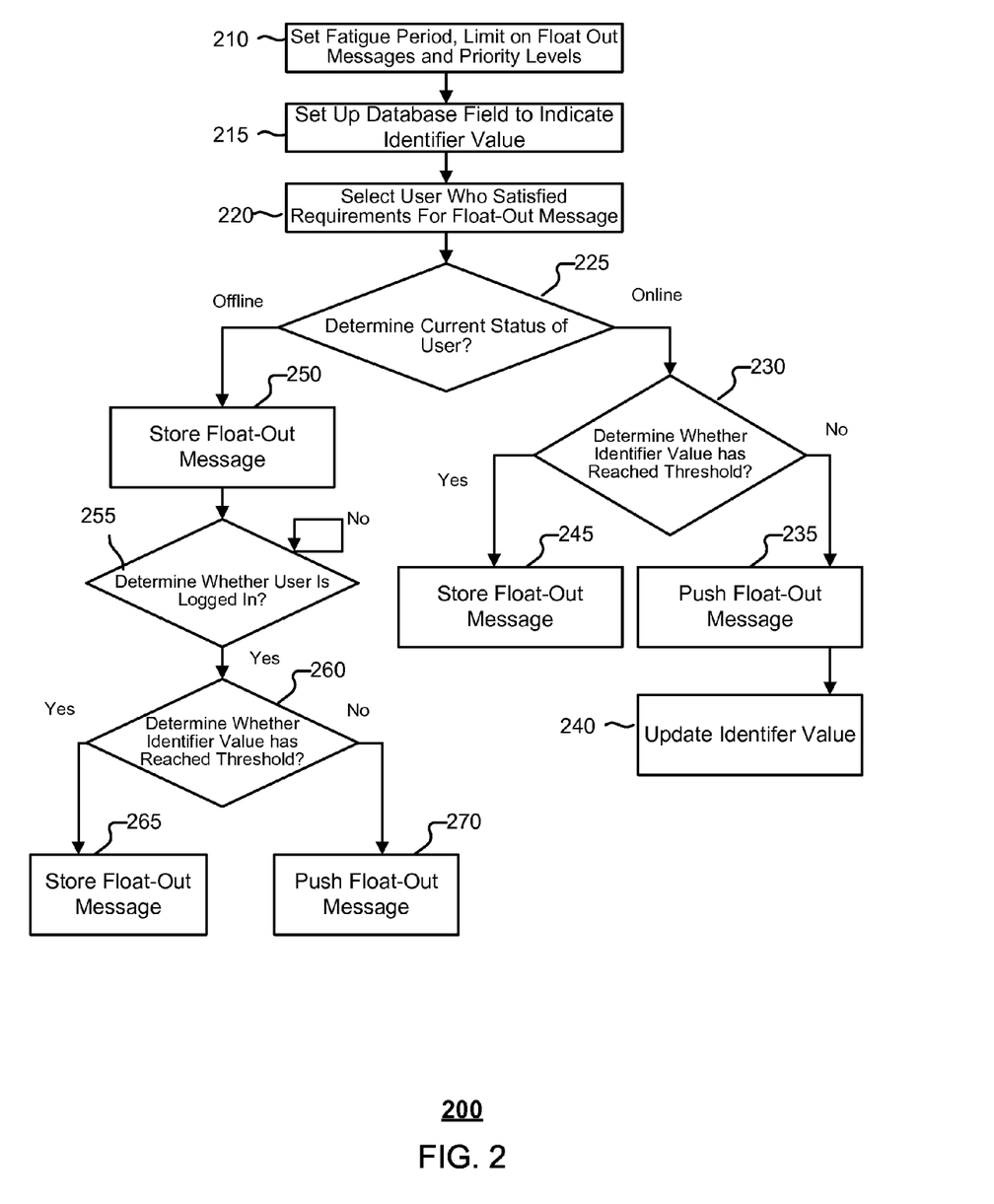
FIG. 2 is a flow chart of an embodiment of a fatigue control-based message float-out method.

FIG. 2 is a flow chart of an embodiment of a fatigue control-based message float-out method. The system 100 can be used to implement the fatigue control-based message float-out method 200. In this embodiment, the float-out message is assumed to be within the fatigue period and is an optional message that is not required to be displayed to the user (e.g., an advertisement, a suggested posting, etc.). Therefore, a server performing the fatigue control-based message float-out method 200 can execute the following steps:

In step 220, the server selects a user who satisfies the float-out message pushing requirements for a certain float-out message. In other words, the user is to be a recipient of the float-out message awaiting transmission. The server has float-out messages awaiting transmission to users, and the users are selected from a message pushing recipient database based on the attributes of the recipients to whom the current float-out message are to be pushed.

In step 225, the server determines the current status of the user. In other words, the server determines whether the user is online or offline.

In step 230, in the event that the current status of the user is online, the server determines whether the identifier value has reached the threshold value. The identifier value is used to determine whether the recipient, i.e., a user, is currently in a state of fatigue, and the identifier value is updated based on the limit on the number of float-out messages within a unit of time.

In some embodiments, the identifier value is a field in a database set in advance, and the identifier value is used to indicate whether the recipient is currently in a state of fatigue. Upon initialization of the identifier value, the identifier value can be set to, for example, 0, and the threshold value can also be set in advance to, for example, 3.

Step 245, in the event that the identifier value has reached the threshold value, the identifier value indicates that the recipient is currently in a state of fatigue, and the server does not push the float-out message and stores the float-out message in a server database;

Step 235, in the event that the identifier value has not reached the threshold value, the identifier value indicates that the recipient is currently not in a state of fatigue, and the server pushes the float-out message to the recipient, so that the float-out message is made available to the recipient.

At this time, the server also increments the identifier value by, for example, 1. For example, the identifier value has been increased from 1 to 2, and the server updates the number of float-out messages received by the recipient in step 240. For example, the updated number of float-out messages received by the recipient is now 2.

In some embodiments, each user has a threshold value for the identifier value. In the event that the identifier value reaches the threshold value (the threshold value being a specific number, such as 3), the identifier value indicates that the user is currently in a state of fatigue, cannot receive any additional task messages, and must wait until the next fatigue period before receiving additional messages. For example, in the event that the identifier value is 3 after the identifier value has been incremented by 1, the identifier value has reached the threshold value of 3, and the identifier value indicates that the user is in a state of fatigue, cannot receive float-out messages. Subsequently, after the fatigue period has ended, the identifier value is reset to 0, as confirmed by a fatigue control module on the server, based on the limit on the number of float-out messages within a unit of time.

In step 240, the server updates the identifier value based on the limit on the number of float-out messages within a unit of time. The updating of the identifier value as described in step 240 includes:

In the event that the server discovers that the stored number of float-out messages received by the recipient has already reached the limit on the number of float-out messages within the fatigue period, the user is deemed to have reached a state of fatigue, and the identifier value is updated. The identifier value can be reset to 0 in the next fatigue period. In the event that the recorded number of float-out messages received by the recipient has not reached the limit on the number of float-out messages within the fatigue period, the server determines whether the fatigue period has expired. In the event that the fatigue period has expired, the identifier value is updated, for example, by resetting the identifier value to 0. Otherwise, the identifier value is not updated.

The sequence of the updating of the identifier value steps described above is not limited by the above description. The updating of the identifier value may be executed subsequent to or substantially simultaneously with other steps. The updating of the identifier value can be triggered periodically, or can be triggered upon receipt of a transmission successful response from the recipient after the transmission of the float-out message to the recipient. For example, after step 235 is performed, the server can receive a push successful response from the client. Subsequently, the server updates the identifier value, in the above-described method (step 240), determines whether the number of float-out messages received by the recipient at this time has reached the limit on the number of float-out messages within the fatigue period, and determines whether the fatigue period has expired. In the event that the fatigue period has not expired, the server does not update the identifier value, and the identifier value continues to be the current value, for example, 1. Therefore, the server fatigue control module 130 can determine whether the identifier value can be updated after each successful push of a float-out message by the server, or determines whether the identifier value can be updated at fixed time intervals.

It is understood that the fatigue period and the limit on the number of float-out messages within the fatigue period can both be set in advance on the server. In some embodiments, the fatigue period can be a dynamic value of time. In some embodiments, the fatigue period can be set to a preset value. For example, the fatigue period can be set to 12 hours or 24 hours.

Therefore, the following steps may be occur before step 220:

In step 210, the server sets a fatigue period of a user, the limit on the number of float-out messages, and float-out message priority levels in advance. Also, the specific content of the float-out message can also be set in advance.

Administrative personnel can set up, via the server administration interface, the fatigue periods and the limits on the number of float-out messages for each user, the float-out message priority level for each float-out message, and the specific content for each float-out message. For example, for the float-out messages in this task, the fatigue period can be set to 12 hours and the limit on the number of float-out messages within the fatigue period can be set to 3. Float-out messages can be promotional advertising for a certain product, information about a new merchant, discount information, etc. The information of the float-out message can be stored in a message database.

In step 215, the server sets up a database field to indicate an identifier value to indicate a fatigue level for each user. For example, the identifier value can be initially set to 0.

In the administrative interface of a user database of the server, administrative personnel can set up an identifier value to express a fatigue level indicating whether the user is currently in a state of fatigue. For example, upon initialization, the identifier value can be set to 0. When the identifier value is 0, the identifier value indicates that the user is not currently in a state of fatigue. After each float-out of messages is sent, or after a periodic amount of time, the server fatigue control module can update the identifier values indicating fatigue levels of the users in the user database, based on the fatigue period, the limit on the number of float-out messages for each user, and the number of float-out messages already floated out to the user. If the fatigue period has expired, the server can update the identifier value by resetting the identifier value to 0.

It should be noted that the correspondences between the fatigue period, the number of float-out messages already received, the limit on the number of float-out messages are stored, and the identifier and threshold values can be recorded on the server. The identifier value expressing a fatigue level also has a correspondence with the aforesaid information.

The above description relates to the situation where the server has float-out messages awaiting to be floated out, and the recipient is logged on. Below is a description of the situation where the recipient is not logged in or offline. Continuing to refer to FIG. 2, the server can also execute the following steps:

In step 250, in the event that the current status of the recipient is offline and float-out messages are awaiting to be floated out or pushed, the server stores the float-out messages in the database.

In step 255, the server determines whether the user is logged on. This step can be repeated until the user is logged on. In the event that the user who satisfies the float-out message pushing requirements subsequently logs onto the instant messaging tool, the method can include the following steps:

In step 260, the server determines whether the identifier value of the user has reached the threshold value.

In step 265, in the event that the identifier value has reached the threshold value, the float-out message is not floated out or pushed, and the server continues to store the float-out message in the database.

In step 270, in the event that the identifier value has not reached the threshold value, the identifier value indicates that the user is not currently in a state of fatigue, and the server extracts the float-out messages according to their priority levels and based on the limit on the number of float-out messages within the fatigue period. For example, the limit on the number of float-out messages within the fatigue period is 3 messages, and the recorded number of float-out messages already received by the user is 2 messages. Thus, in this example, the number of float-out messages that can still be pushed is 1 message, and then the float-out message is pushed to the user.

In the steps described above, the float-out messages are assumed to be floated out within validity period and non-mandatory. Before the performance of step 225, the server can also determine whether the time information contained in the float-out messages is within the validity period. In the event that the float-out message is within the validity period, then step 225 and step 230 are executed to determine whether the identifier value of the recipient has reached the threshold value. It is understood that the server records a log of the float-out messages, and the log contains time information used to indicate the validity period of the float-out messages. For example, the validity period can be 1 week, 3 days, 1 day, or 1 hour.

Additionally, the recorded log of the float-out messages can also contain mandatory information indicating whether float out of the float-out messages is mandatory. After step 225, the server can also determine whether the float-out message contains information indicating whether float-out of the float-out message is mandatory. For example, a message can be indicated to be mandatory when a special offer is presented to the recipient, such as a special discount, or important news. In the event that the float-out of the float-out message is not mandatory, the server then determines whether the identifier value of the recipient has reached the threshold value. On the other hand, in the event that the float out of the float-out message is mandatory, the server pushes the float-out message regardless of the identifier value.

All of the float-out messages transmitted to users can have validity periods and information indicating whether the float-out message is mandatory. The characteristics of the float-out messages can be set by administrative personnel during step 210. In the event that the float-out message is within the validity period and is non-mandatory, the steps after step 230 can be performed. In the event that the float-out message is not within the validity period, the float-out message is not floated out, or in the event that the float-out message is a mandatory message, the server floats out the float-out message directly, and the steps corresponding to the fatigue control are not performed. The aforesaid determination as to whether the float-out message is within the validity period and is a non-mandatory message is well known and will not be further discussed for conciseness.

Regarding steps 245 and 265, because the identifier value has already reached the threshold value, which indicates that the recipient is currently in a state of fatigue, the server stores the messages awaiting float-out to the recipient when the recipient enters the next fatigue period. For example, the server periodically updates the identifier value, and after the identifier value is updated, in the event that the server determines that the current status of the user to be online, the server pushes the float-out messages in accordance with the priority levels of the float-out messages and the limit on the number of float-out messages within the fatigue period. For example, messages with a high priority level are pushed out before messages with a medium or low priority level.

Two situations have been described for users who are not consistently online. For long-term online users who are online for more than a certain period of time, the server fatigue control module periodically reads the identifier value from the user database to determine the fatigue level of the user. After the identifier value has been reset to 0, the server pushes float-out messages to the user.

Therefore, the fatigue control-based message float-out method implements fatigue control of float-out messages for users based on the setting of the fatigue periods for the recipients of float-out messages and the limit on the number of float-out messages within the fatigue period, and uses priority levels of the float-out messages to enable users to receive float-out messages that are of interest and/or important within an acceptable fatigue period when a plurality float-out messages to be received during which the user is offline.

Fatigue control of message float-out can be implementation by the server as described above, and also fatigue control can also be implemented on the instant messaging client.

Figure 3:
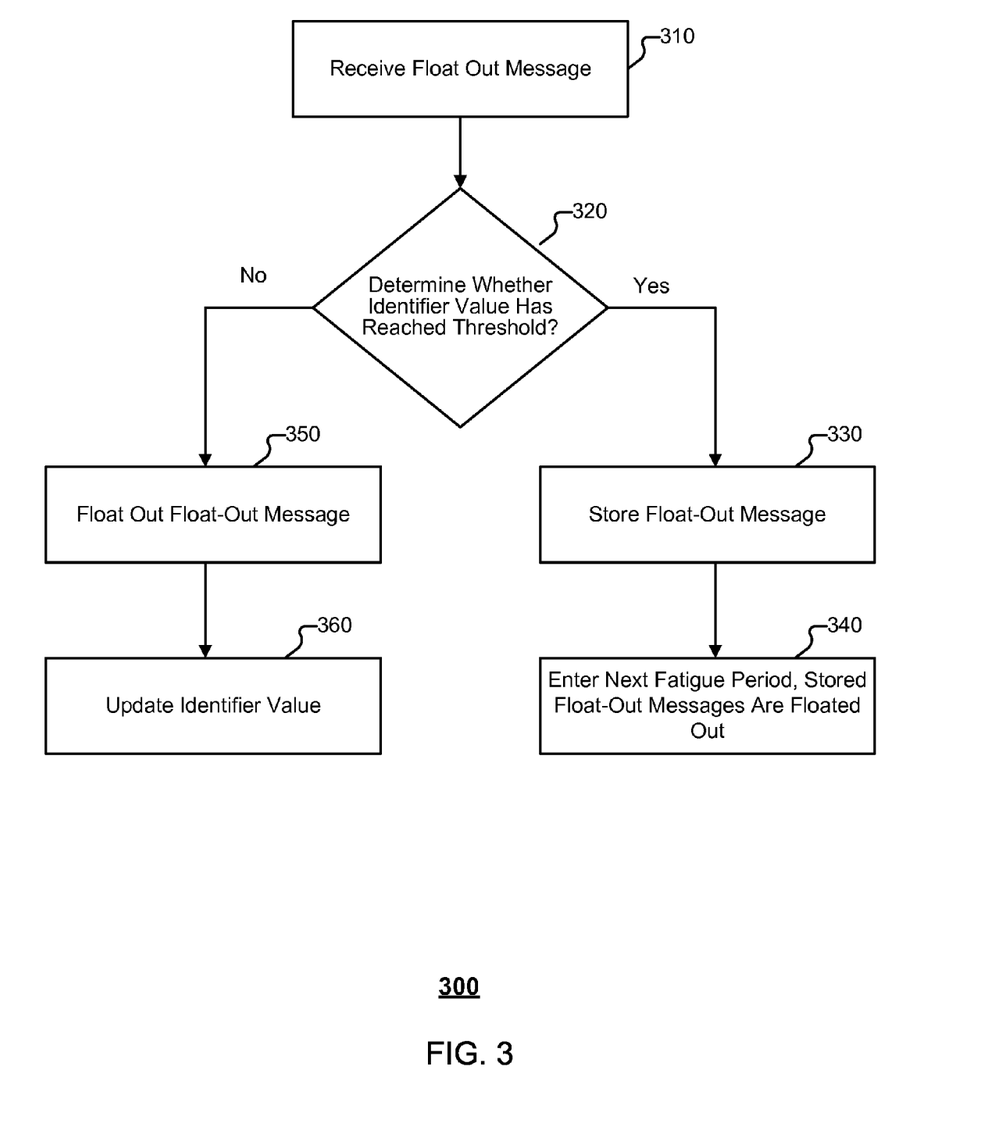
FIG. 3 is a flow chart of an embodiment of a fatigue control-based message float-out method.

FIG. 3 is a flow chart of an embodiment of a fatigue control-based message float-out method. The fatigue control-based message float-out method 300 utilizes the instant messaging client as the subject. After the instant messaging client is launched, the instant messaging client implements the following steps:

In step 310, the instant messaging client receives a float-out message.

In step 320, the instant messaging client determines whether the identifier value has reached the threshold value. The identifier value is used to indicate whether the recipient is currently in a state of fatigue, and the identifier value is updated based on the limit on the number of float-out messages within a fatigue period.

It is understood that the identifier value is a field that indicates the fatigue level of a user. The field can already be set when the user registers the instant messaging client. For example, upon registration of the instant message client, the field corresponding to the identifier value can be set to 0. When the identifier value is 0, the identifier value indicates that the user is not currently in a state of fatigue. After each float-out message is pushed, or periodically, the client fatigue control module of the instant messaging client updates the identifier value indicating the fatigue of the user based on the fatigue period, the limit on the number of float-out messages within the fatigue period, and the number of float-out messages already received by the user. After the expiration of the fatigue period, the updating of the identifier value resets the identifier value to, for example, 0.

It is also understood that the fatigue period and the limit on the number of float-out messages within the fatigue period can be set in advance by the user on the instant messaging client. For example, after the instant messaging client is initialized, the user configures the fatigue period deemed to be suitable, for example, 10 hours, and the limit on the number of float-out messages that the user can receive within the fatigue period of 10 hours is, for example, 3 messages. In other words, the limit on the number of float-out messages indicates that the maximum number of float-out messages received during the fatigue period is 3, and updating of the identifier value is performed based on the limit on the number of float-out messages within the fatigue period. The threshold value of the identifier value is set according to the corresponding limit on the number of float-out messages. For example, the threshold value can be set to 2.

In step 350, in the event that the identifier value has not reached the threshold value, the identifier value indicates that the recipient is not currently in a state of fatigue, and the float-out message is floated out to the recipient.

After step 350 is complete, the instant messaging client adds a value, for example, of 1 to the identifier value, and records the number of float-out messages already received.

For example, the instant messaging client has received 1 float-out message so far. It should be noted that the correspondences between the fatigue period, the float-out messages already received, the limit on the number of float-out messages have been stored, and the identifier and threshold values have been recorded accordingly on the client. There is also a correspondence between this identifier value and the information described above.

For example, the initial value of the identifier value is 0. At this time, because a float-out message has been received, the identifier value is incremented. After 1 is added to the identifier value, the identifier value becomes 1. At the same time, the instant messaging client also records the number of float-out messages received, which is 1. Because the client fatigue control module determines whether to update the identifier value after each float-out of messages, at this time, the client fatigue control module determines that the number of float-out messages received, 1, during this fatigue period has not reached the limit on the number of float-out messages, for example, 3. Thus, the identifier value does not need to be updated.

In step 330, in the event that the identifier value has reached the threshold value, the identifier value indicates that the recipient is currently in a state of fatigue, and the float-out message is stored in a local database.

For example, the instant messaging client determines that the identifier value is 2, and has reached the threshold value, and thus, the instant messaging client stores the float-out message in a local database. Subsequently, the instant messaging client awaits the updating of the identifier value by the client fatigue control module. For example, the instant messaging client can wait for the next fatigue period. Assuming that during the waiting of entry into the next fatigue period, the client receives three more float-out messages. In other words, at this time, the instant messaging client has a total of 4 float-out messages stored for float-out. During the method, each time a float-out message is received, the client fatigue control module can be triggered to determine whether the fatigue period has expired, or the client fatigue control module can periodically determine whether the fatigue period has expired. For example, the client fatigue control module can determine whether the fatigue period has expired at 5-minute intervals. In the event that the fatigue period has expired, the identifier value is updated to be reset to 0, and the method enters into the next fatigue period. At this time, when the method enters into the next fatigue period, the number of float-out messages is recorded as 0, the limit on the number of messages is 3, and the identifier value is 0. In the event that the next fatigue period is newly entered into, the instant messaging client can further perform the following steps:

In step 340, the stored float-out messages are floated out according to the priority levels of the messages and the limit on the number of float-out messages within the fatigue period.

The float-out messages include priority level information, and the instant messaging client floats out the float-out messages according to priority levels within the limit on the float-out messages within the fatigue period based on the priority level of the float-out message. Because, in this example, there are now four messages waiting to be floated out, but only three messages are permitted to float out within the unit of time of this fatigue period, the three float-out messages having the highest priority level are floated out according to priority level, and the float-out message having the lowest priority level is saved or deleted. It is understood that upon the floating out of each float-out message by the instant messaging client, the client fatigue control module determines whether the identifier value is to be updated. Also, at this time, the instant messaging client records the number of float-out messages already floated out, and adds, for example, 1 to the identifier value each time a message is floated out. This method is repeated in the same manner while the client remains online.

Thus, the updating of the float-out message can be triggered periodically, or can be triggered after the floating out of the float-out message. In step 360, the instant messaging client updates the identifier value after floating out the float-out message in step 350. The updating of the identifier value is performed based on the limit on the number of float-out messages within the fatigue period. In another example, the updating of the identifier value includes: in the event that the number of float-out messages received has already reached the limit on the number of float-out messages within the fatigue period, the user is in a state of fatigue, and the identifier value is updated. On the other hand, in the event that the number of float-out messages received has not reached the limit on the number of messages, the instant messaging client determines whether the fatigue period has expired. In the event that the fatigue period has expired, the identifier value is updated. In the event that the fatigue period has not expired, the identifier value is not updated.

Therefore, the fatigue control-based message float-out method implements proactive setting of fatigue controls on the instant messaging client, whereby the user can set the fatigue period and the limit on the number of float-out messages within the fatigue period. The setting of the fatigue period and the limit on the number of float-out messages enables a control of the number of float-out messages that the user can receive within a certain time. Also, when the user logs onto the instant messaging clients, if a plurality of float-out messages needs to be received for float-out, priority levels of the float out messages are used to float out messages that are important and of interest based on the priority levels of the float-out messages.

Figure 4:
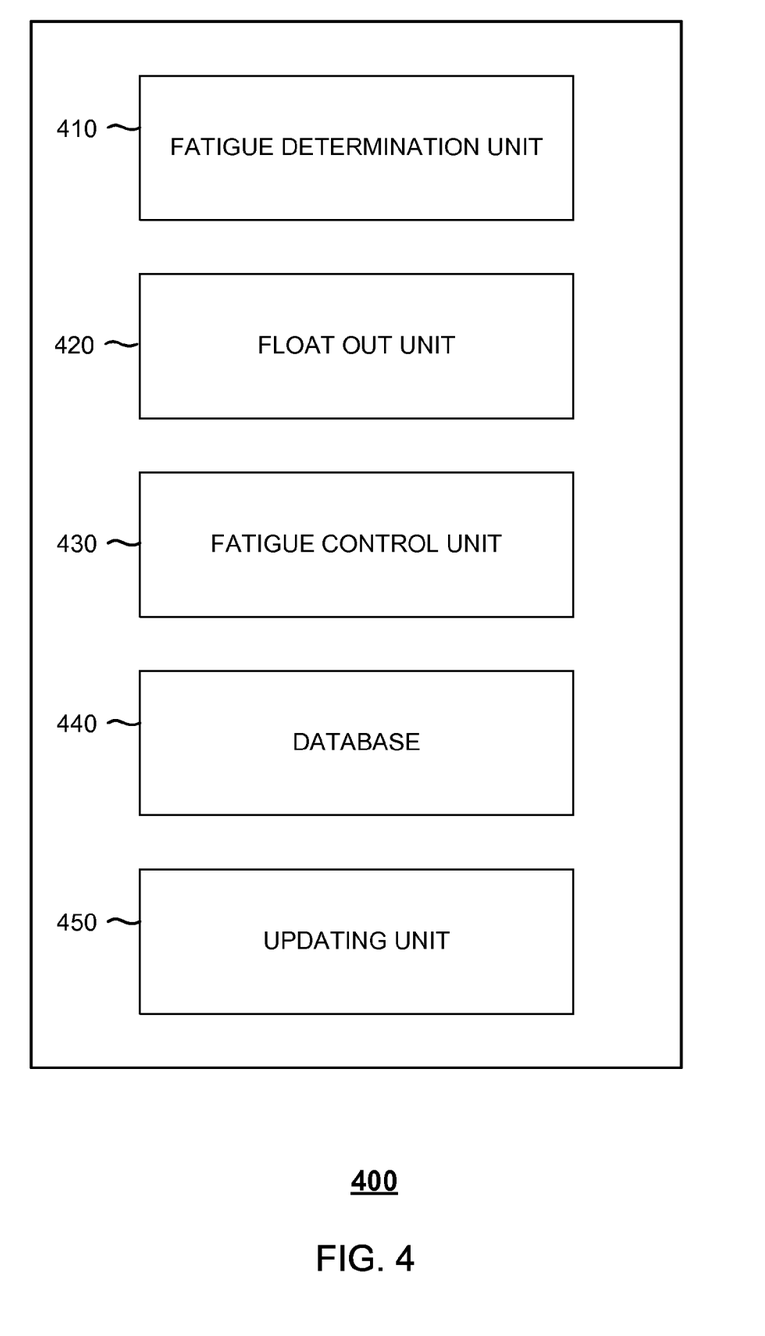
FIG. 4 is a schematic diagram of an embodiment of a fatigue control-based message float-out server.

FIG. 4 is a schematic diagram of an embodiment of a fatigue control-based message float-out server. The fatigue control-based message float-out server 400 includes a fatigue determination unit 410, a float out unit 420, a fatigue control unit 430, database 440, and an updating unit 450.

The fatigue determination unit 410 is configured to in the event that float-out messages are awaiting float-out, and the current status of the recipient of the float-out messages is online, determine whether the identifier value of the recipient has reached the threshold value. The identifier value is used to indicate whether the recipient is currently in a state of fatigue, and is updated based on the limit on the number of float-out messages within a unit of time. The unit of time can be a fatigue period.

The float out unit 420 is configured to in the event that the identifier value has not reached the threshold value, transmit the float-out message to the recipient making the float-out message available to the recipient for float-out. The identifier value not reaching the threshold value indicates that the recipient is currently not in a state of fatigue.

The fatigue control-based message float-out server can further include the fatigue control unit 430. The fatigue control unit 430 is configured to update the identifier value based on the limit on the number of float-out messages within a unit of time. The unit of time can be a fatigue period.

Administrative personnel can set up in advance the fatigue period, the limit on the number of float-out messages for each user, the priority level for each float-out message, and the specific content of each float-out message, in the database 440 on the fatigue control-based message float-out server. For example, the fatigue period for the messages can be set to 12 hours, the limit on the number of float-out messages can be set to 3, and the specific content of the float-out messages can be promotional advertising for a certain product, information about a new merchant, or discount information. The specific content can be stored in the database 440. In the database 440, an identifier value expressing the level of fatigue can be stored, and the server stores the identifier value indicating the fatigue level for each user in the database 440. For example, upon initialization, the field value is set to 0. When the identifier value is 0, the identifier value indicates that the user is not currently in a state of fatigue, and the updating unit 450 is configured to update the identifier value based on the fatigue period, the limit on the number of float-out messages, and the number of float-out messages already floated out to the user. For example, the updating unit 450 resets the identifier value to 0.

In the event that the fatigue control unit 430 determines that the number of float-out messages already floated out to the user has reached the limit on the number of float-out messages, subsequently the fatigue period has been reached, and the updating unit 450 updates the fatigue value to, for example, 0. The number of float-out messages already floated out to the user is the number of float-out messages received by the user recorded by the fatigue control-based message float-out server in the database subsequent to each float-out message floated out. In the event that the number of float-out messages already floated out to the user has not reached the limit on the number of float-out messages, the fatigue control unit 430 determines whether the fatigue period of the user has expired. In the event that the fatigue period has expired, the fatigue period is updated. For example, the identifier value is reset to 0. In the event that the fatigue period has not expired, the identifier value is not updated.

The fatigue control unit 430 is further configured to in the event that the recorded number of float-out messages received has already reached the limit on the number of float-out messages within the fatigue period, the user determined to be in a state of fatigue, and the fatigue control unit 430 updates the identifier value. In the event that the recorded number of float-out messages received has not reached the limit on the number of messages, the fatigue control unit 430 determines whether the fatigue period has expired. In the event that the fatigue period has expired, the fatigue control unit 430 updates the identifier value. In the event that the fatigue period has not expired, the fatigue control unit 430 does not update the identifier value.

In some embodiments, the fatigue control unit 430 is triggered periodically. In some embodiments, the fatigue control unit 430 is triggered upon receipt of a transmission success response after the float out unit 420 transmits the float-out message to the recipient.

The duration of the fatigue period can be a dynamic value, and the fatigue period can have a duration such as, for example, 12 hours or 24 hours. For example, if the fatigue period is set to 12 hours, the fatigue period is a dynamic 12-hour period.

For each user, a threshold value for the identifier value is set. In the event that the identifier value reaches the threshold value, the user is currently in a state of fatigue, and cannot receive any more messages. The fatigue control-based message float-out server 400 waits for the next fatigue period to send the stored messages. For example, in the event that after the identifier value is updated by adding 1 to now become 3, the identifier value indicates that the user is currently in a state of fatigue and cannot receive task messages. At the beginning of the next fatigue period, the fatigue control-based message float-out server 400 updates the identifier value by resetting of the identifier value to 0 and the fatigue control unit 430 confirms the identifier value based on the limit on the number of float-out messages within the fatigue period.

The fatigue determination unit 410 is further configured to in the event that the identifier value has reached the threshold value, at this time, the identifier value indicates that the recipient is currently in a state of fatigue, and the float-out message is stored. In another example, in the event that float-out messages await floating out, and the current status of the recipient of the float-out messages is offline, the fatigue control-based message float-out server 400 stores the float-out messages.

Furthermore, the fatigue determination unit 410 is configured to, at the time of first log-in after the current status of the recipient of the float-out message is offline, determine whether the identifier value for the recipient has reached the threshold value.

The float-out unit 420 is configured to, in the event that the identifier value has not reached the threshold value, float out the float-out messages according to the priority levels of the float-out messages and the limit on the number of float-out messages within the fatigue period. The identifier value indicates that the recipient is not currently in a state of fatigue.

Additionally, the fatigue determination unit 410 is configured to first determine whether the time information contained in the log of float-out messages is within the validity period. In the event that the time information is within the validity period, the fatigue control-based message float-out server 400 determines whether the identifier value of the recipient has reached the threshold value. It is understood that the fatigue control-based message float-out server 400 keeps a log of the float-out messages, and the log includes time information used to be compared with the validity periods of the float-out messages.

Additionally, the log of the float-out messages also has mandatory information used to determine whether the float-out of a float-out message is mandatory. The fatigue determination unit 410 is further configured to first determine whether the float-out message contains information about whether the float-out of the float-out message is mandatory. In the event that the float-out of the float-out message is not mandatory, the fatigue determination unit 410 is configured to determine whether the identifier value of the recipient has reached the threshold value.

Therefore, by performing fatigue control of float-out messages for users based on the fatigue period, the priority levels of float-out messages, and the limits on the number of float-out messages, the present application enables users to receive float-out messages that are of interest and important within an acceptable fatigue period.

Figure 5:
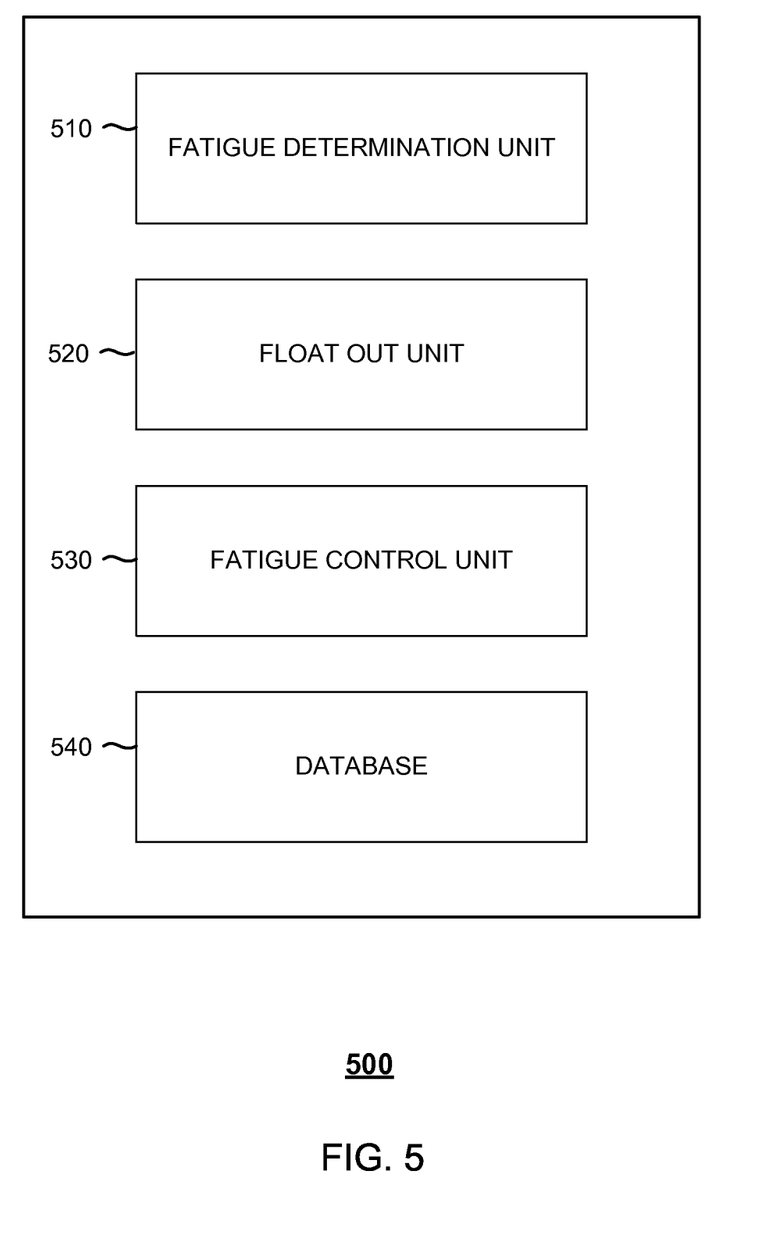
FIG. 5 is a schematic diagram of an embodiment of a fatigue control-based instant messaging client.

FIG. 5 is a schematic diagram of an embodiment of a fatigue control-based instant messaging client. The fatigue control-based instant messaging client 500 includes a fatigue determination unit 510, float out unit 520, a fatigue control unit 530, and a database 540.

The fatigue determination unit 510 is configured to, in the event that a float-out message is received, determine whether the identifier value has reached the threshold value. The identifier value indicates whether the recipient of the float-out message is currently in a state of fatigue, and the identifier value is updated based on the limit on the number of float-out messages within a unit of time.

The float out unit 520 is configured to, in the event that the identifier value has not reached the threshold value, float out the float-out message. The identifier value not reaching the threshold value indicates that the recipient is currently not in a state of fatigue.

The float out unit 520 is further configured to add, for example, 1 to the identifier value, and record the number of float-out messages received.

At this time, the fatigue control-based instant messaging client 500 records the number of float-out messages already received within the fatigue period, for example, 1 float-out message has been received so far. It should be noted that the correspondences between the fatigue period, the number of float-out messages already received, and the limit on the number of float-out messages are stored, and the identifier and the threshold values have been recorded accordingly on the fatigue control-based instant messaging client 500. There is also a correspondence between this identifier value and the aforesaid information.

For example, the identifier value is initially at, for example, 0. Because a float-out message has been received, after adding 1, the identifier value becomes 1. At the same time, the fatigue control-based instant messaging client 500 also records the number of float-out messages received as 1.

Because the fatigue determination unit 510 determines whether the identifier value is to be updated after each float-out of messages, the fatigue control unit 510 determines that the 1 float-out message received during the fatigue period has not reached the limit on the number of float-out messages. For example, the limit on the number of float-out messages can be 3. Thus, the identifier value does not need to be updated.

The fatigue control unit 530 is configured to update the identifier value based on the limit on the number of float-out messages within a unit of time. For example, the unit of time can be the fatigue period.

The fatigue determination unit 510 is further configured to, in the event that the identifier value has reached the threshold value, store the float-out message. The identifier value reaching the threshold value indicates that the recipient is currently in a state of fatigue.

For example, the fatigue determination unit 510 determines that the identifier value is 2, and the identifier value has already reached the threshold value. Thus, the fatigue determination unit 510 stores the float-out message temporarily in the local database 540 and waits for the updating of the identifier value by the fatigue control unit 530. In other words, the fatigue control unit 530 awaits entry into the next fatigue period before updating the identifier value. Assume that during the waiting of the next fatigue period, the fatigue control-based instant messaging client 500 receives an additional three float-out messages to be floated out. The fatigue control-based instant messaging client 500 now has stored four float-out messages. Each time another float-out message is received, the fatigue control unit 530 can be triggered to determine whether the fatigue period has expired, or the fatigue control unit 530 can determine periodically (for example, every 5 minutes) whether the fatigue period has expired. In the event that the fatigue period has expired, the identifier value is updated, for example, reset to 0, and the next fatigue period is entered. At this time, the recorded number of float-out messages already received is 0, the limit on the number of float-out messages within the fatigue period is 3, and the identifier value is 0.

Therefore, the float out unit 520 is further configured to, after the identifier value has been updated, float out the stored float-out messages according to the priority levels of the float-out messages and the limit on the number of float-out messages within the fatigue period.

The fatigue control unit 530 is further configured to, in the event that the recorded number of float-out messages received has already reached the limit on the number of float-out messages within the fatigue period, update the identifier value. By reaching the limit on the number of float-out messages within the fatigue period, the recorded number of float-out messages received indicates that the user is in a state of fatigue. In the event that the recorded number of float-out messages received has reached the limit on the number of messages, the fatigue control unit 530 determines that recipient is in a state of fatigue and stores the float-out message. In the event that the fatigue period has already expired, the identifier value is updated. In the event that the fatigue period has not expired, the identifier value is not updated.

In some embodiments, the fatigue control unit 530 is triggered periodically. In some embodiments, the fatigue control unit 530 is triggered upon receipt of a transmission success response from the client after the float-out unit 520 floats out the float-out message.

It is understood that the identifier value is a field value used to indicate the fatigue level of a user, and the identifier value is already set when the user registers the instant messaging client. For example, upon registration, the identifier value is set to 0. In the event that the identifier value is 0, the identifier value indicates that the user is not currently in a state of fatigue. After each float-out of messages, or periodically, the fatigue control 530 of the instant messaging client updates the identifier value indicating the fatigue level based on the fatigue period, the limit on the number of float-out messages within the fatigue period, and the number of float-out messages already received by the user. The updating of the identifier value can reset the initial value to 0.

It is further understood that the fatigue period and the limit on the number of float-out messages within the fatigue period can be set in advance on the instant messaging client by the user. For example, the fatigue period and the limit on the number of float-out messages within the fatigue period can be set after the instant messaging client is installed. The user configures a fatigue period deemed to be suitable, for example, 10 hours, and the limit on the number of float-out messages the user can receive within the fatigue period of 10 hours, for example, is 3 messages. In other words, the limit on the number of float-out messages the user can receive within the fatigue period indicates that the maximum number of float-out messages to be received during the fatigue period is 3, and the updating of the identifier value is performed based on the limit on the number of float-out messages within the fatigue period. The threshold value of the identifier value is set according to the limit on the number of float-out messages. For example, the threshold value is set to 2.

Therefore, the fatigue control-based instant messaging client 500 can implement proactive setting of fatigue control. The user can set the fatigue period and the limit on the number of float-out messages within the fatigue period, controlling the number of float-out messages received within a certain unit of time. In the event that the user logs into the instant messaging client and if there are a plurality of float-out messages to be received for float-out, the float-out messages are floated out based on the priority levels of the float-out messages. The priority levels are used to float out messages that are important and of interest.

The units described above can be implemented as software components executing on one or more general purpose processors, as hardware such as programmable logic devices and/or Application Specific Integrated Circuits designed to perform certain functions or a combination thereof. In some embodiments, the units can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present invention. The units may be implemented on a single device or distributed across multiple devices. The functions of the units may be merged into one another or further split into multiple sub-units.

The methods or algorithmic steps described in light of the embodiments disclosed herein can be implemented using hardware, processor-executed software modules, or combinations of both. Software modules can be installed in random-access memory (RAM), memory, read-only memory (ROM), electrically programmable ROM, electrically erasable programmable ROM, registers, hard drives, removable disks, CD-ROM, or any other forms of storage media known in the technical field.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of controlling float-out messages, comprising:
setting a fatigue period, a limit on number of float-out messages within the fatigue period, and priority levels for the float-out messages;
in the event that at least one float-out message is ready to be sent to a recipient:
determining a current status of the recipient of the at least one float-out message;
in the event that the current status of the recipient of the at least one float-out message is offline:
storing the at least one float-out message;
upon first log in after the current status of the recipient of the at least one float-out message is offline, determining whether an identifier value of the recipient has reached the threshold value; and
in the event that the identifier value has not reached the threshold value:
determining a possible number of float-out messages to be sent based at least in part on the limit on the number of float-out messages within the fatigue period and the identifier value;
in the event that a number of the at least one float-out message to be sent exceeds the possible number of float-out messages to be sent, selecting the determined possible number of float-out messages from the at least one float-out message to be sent based on a priority level of the at least one float-out message to be sent; and
transmitting the selected possible number of the at least one float-out message;
in the event that the current status of the recipient is online:
determining, using one or more processors, whether the float-out message should be sent to the recipient, including determining whether an identifier value of the recipient has reached a threshold value, the identifier value being used to indicate whether the recipient is deemed to be currently in a state of fatigue or a level of fatigue the recipient is deemed to be in;
in the event that the identifier value has not reached the threshold value:
pushing the float-out message to the recipient to be made available for float out by the recipient; and
updating the identifier value.

2. The method as described in claim 1, wherein in the event that the identifier value has reached the threshold value, the method further comprising storing the float-out message.

3. The method as described in claim 1, further comprising recording of the number of float-out messages received by the recipient.

4. The method as described in claim 1, further comprising:
recording of a log of the float-out message, the log including time information used to express a validity period of the float-out message; and
determining whether the time information of the log of the float-out message falls within the validity period, wherein determining whether the identifier value of the recipient has reached the threshold value is performed in the event that the float-out message falls within the validity period.

5. The method as described in claim 1, further comprising:
recording of a log of the float-out message, the log including mandatory information used to indicate whether float out of the float-out message is mandatory;
determining whether the mandatory information of the log of the float-out message indicates that float out of the float-out message is mandatory; and
in the event that the mandatory information indicates that the float-out message is not mandatory, determining whether the identifier value of the recipient has reached the threshold value.

6. The method as described in claim 3 further comprises:
setting in advance of the updating of the identifier value a fatigue period and a limit on the number of float-out messages within the fatigue period, wherein the updating of the identifier value comprises:
in the event that the recorded number of float-out messages received by the recipient has reached the limit on the number of messages, updating the identifier value;
in the event that the recorded number of float-out messages received by the recipient has not reached the limit on the number of messages, determining whether the fatigue period has expired; and
in the event that the fatigue period has expired, updating the identifier value.

7. The method as described in claim 6, wherein the updating of the identifier value is triggered periodically, or is triggered upon receipt of a transmission success response after the pushing of the float-out message to the recipient.

8. The method as described in claim 1, wherein the updating of the identifier value comprises:
in the event that a recorded number of float-out messages received by the recipient has reached the limit on the number of messages:
determining whether the fatigue period has expired; and
in the event that the fatigue period has not expired, omitting updating the identifier value.

9. A method of controlling float-out messages, the method comprising:
setting a fatigue period, a limit on number of float-out messages within the fatigue period, and priority levels for the float-out messages;
in the event that at least one float-out message is received, determining, using one or more processors, whether an identifier value has reached the threshold value, the identifier value being used to indicate whether a recipient of the at least one float-out message is deemed to be currently in a state of fatigue or a level of fatigue the recipient is deemed to be in;
in the event that the identifier value has not reached the threshold value:
determining a possible number of messages to be floated out based at least in part on the limit on the number of float-out messages within the fatigue period and the identifier value;
in the event that a number of the at least one message to be floated out exceeds the possible number of messages to be floated out:
selecting the possible number of messages to be floated out from the at least one message to be floated out based on a priority level of the at least one message to be floated out; and
floating out the selected possible number of the messages to be floated out; and
updating the identifier value.

10. The method as described in claim 9, wherein in the event that the identifier value has reached the threshold value, the method further comprising storing the float-out message.

11. The method as described in claim 9, further comprising recording of the number of float-out messages received.

12. The method as described in claim 11, further comprising:
setting in advance of the updating of the identifier value a fatigue period and a limit on the number of float-out messages within the fatigue period, wherein the updating of the identifier value comprising:
in the event that the recorded number of float-out messages received has reached the limit on the number of float-out messages within the fatigue period, updating the identifier value, the recorded number of float-out messages received reaching the limit on the number of float-out messages indicating that a recipient is deemed to be currently in a state of fatigue;
in the event that the recorded number of float-out messages received has not reached the limit on the number of float-out messages within the fatigue period, determining whether the fatigue period has expired; and
in the event that the fatigue period has expired, updating the identifier value.

13. The method as described in claim 12, wherein the updating of the identifier value is triggered periodically, or is triggered after the float out of the float-out message.

14. A system for controlling float-out messages, comprising:
at least one processor configured to:
set a fatigue period, a limit on number of float-out messages within the fatigue period, and a priority level for the float-out message;
in the event that at least one float-out message is ready to be sent to a recipient:
determine a current status of the recipient of the at least one float-out message;
in the event that the current status of the recipient of the at least one float-out message is offline:
store the at least one float-out message;
upon first log in after the current status of the recipient of the at least one float-out message is offline, determine whether an identifier value of the recipient has reached the threshold value; and
in the event that the identifier value has not reached the threshold value:
determine a possible number of float-out messages to be sent based at least in part on the limit on the number of float-out messages within the fatigue period and the identifier value;
in the event that a number of the at least one float-out message to be sent exceeds the possible number of float-out messages to be sent, select the determined possible number of float-out messages from the at least one float-out message to be sent based on a priority level of the at least one float-out message to be sent; and
transmit the selected possible number of the at least one float-out message;
in the event that the current status of the recipient is online:
determine whether the float-out message should be sent to the recipient, including determine whether an identifier value of the recipient has reached a threshold value, the identifier value being used to indicate whether the recipient is deemed to be currently in a state of fatigue or a level of fatigue the recipient is deemed to be in;
in the event that the identifier value has not reached the threshold value:
push the float-out message to the recipient to be made available for float out by the recipient; and
update the identifier value; and
a memory coupled to the at least one processor and configured to provide the at least one processor with instructions.

15. An instant messaging client for controlling float-out messages, wherein the client comprises:
at least one processor configured to:
set a fatigue period, a limit on number of float-out messages within the fatigue period, and priority levels for the float-out messages;
in the event that at least one float-out message is received, determine whether an identifier value has reached the threshold value, the identifier value being used to indicate whether a recipient of the at least one float-out message is deemed to be currently in a state of fatigue or a level of fatigue the recipient is deemed to be in;
in the event that the identifier value has not reached the threshold value:
determine a possible number of messages to be floated out based at least in part on the limit on the number of float-out messages within the fatigue period and the identifier value;
in the event that a number of the at least one message to be floated out exceeds the possible number of messages to be floated out:
select the determined possible number of messages to be floated out from the at least one message to be floated out based on a priority level of the at least one message to be floated out; and
float out the selected possible number of messages to be floated out; and
update the identifier value;
a memory coupled to the at least one processor and configured to provide the at least one processor with instructions.

16. A computer program product for controlling float-out messages, the computer program product being embodied in a non-transitory tangible computer readable storage medium and comprising computer instructions for:
setting a fatigue period, a limit on number of float-out messages within the fatigue period, and a priority level for the float-out message;
in the event that at least one float-out message is ready to be sent to a recipient:
determining a current status of the recipient of the float-out message;
in the event that the current status of the recipient of the at least one float-out message is offline:
storing the at least one float-out message;
upon first log in after the current status of the recipient of the at least one float-out message is offline, determining whether an identifier value of the recipient has reached the threshold value; and
in the event that the identifier value has not reached the threshold value:
determining a possible number of float-out messages to be sent based at least in part on the limit on the number of float-out messages within the fatigue period and the identifier value;
in the event that a number of the at least one float-out message to be sent exceeds the possible number of float-out messages to be sent, selecting the determined possible number of float-out messages from the at least one float-out message to be sent based on a priority level of the at least one float-out message to be sent; and transmitting the selected possible number of the at least one float-out message;

in the event that the current status of the recipient is online:

determining whether the float-out message should be sent to the recipient, including determining whether an identifier value of the recipient has reached a threshold value, the identifier value being used to indicate whether the recipient is deemed to be currently in a state of fatigue or a level of fatigue the recipient is deemed to be in;

in the event that the identifier value has not reached the threshold value:

pushing the float-out message to the recipient to be made available for float out by the recipient; and updating the identifier value.

17. A computer program product for controlling float-out messages, the computer program product being embodied in a non-transitory tangible computer readable storage medium and comprising computer instructions for:

setting a fatigue period, a limit on number of float-out messages within the fatigue period, and priority levels for the float-out messages;

in the event that at least one float-out message is received, determining whether an identifier value has reached the threshold value, the identifier value being used to indicate whether a recipient of the at least one float-out message is deemed to be currently in a state of fatigue or a level of fatigue the recipient is deemed to be in;

in the event that the identifier value has not reached the threshold value:

determining a possible number of messages to be floated out based at least in part on the limit on the number of float-out messages within the fatigue period and the identifier value;

in the event that a number of the at least one message to be floated out exceeds the possible number of messages to be floated out:

selecting the possible number of messages to be floated out from the at least one message to be floated out based on a priority level of the at least one message to be floated out; and floating out the selected possible number of the messages to be floated out; and updating the identifier value.

\* \* \* \* \*